United States Patent Office 3,364,257
Patented Jan. 16, 1968

3,364,257
PROCESS FOR THE PREPARATION OF MONOCHLORACETIC ACID
Paulin Emmanuel Mounier, Lyon, France, assignor to Rhone-Poulenc S.A., Paris, France, a corporation of France
No Drawing. Filed July 12, 1965, Ser. No. 471,422
7 Claims. (Cl. 260—530)

ABSTRACT OF THE DISCLOSURE

Monochloracetic acid is made by contacting monochloracetaldehyde at 20° to 100° C. with gaseous oxygen at atmospheric pressure to 50 bars pressure in the presence of a liquid lower alkanoic acid, a cobaltous salt, and, as promoter, a halogen-free aldehyde or halogen-free ketone.

---

This invention relates to the preparation of monochloracetic acid.

It is known to prepare monochloracetic acid by the oxidation of chloracetaldehyde, but heretofore this oxidation has only been effected with chemical oxidizing agents. For example, according to French Patent No. 979,134 and Russian Patent No. 110,145, chlorine has been used as oxidizing agent, optionally with ultra-violet irradiation. The formation of hydrochloric acid inherent in this process, and the secondary chlorination reaction involving the formation of dichloracetic acid, complicates this process.

According to French Patent No. 1,024,751, the oxidation of chloracetaldehyde has been carried out with hypohalous acids, but the yields obtained are less than 70%.

According to Natterer to (Mon., 3, 457 (1883)) and Russian Patent No. 119,875, the oxidation has been carried out with nitric acid, but this reaction, which can be very violent, requires rigorous control of the reaction temperature. It has also been shown that in this method of oxidation, chloronitromethanes are formed, which are toxic.

Heretofore, chloracetaldehyde has not been successfully oxidized to chloracetic acid with oxygen. Natterer (loc. cit.) showed that chloracetaldehyde is not oxidized by air either in the dry state or in aqueous solution. In addition, French Patent No. 1,024,751 cited above describes attempts to oxidize chloracetaldehyde to chloracetic acid with oxygen either directly at 45° C., or in chloracetic acid solution in the presence of a manganous chloracetate catalyst at 35° C. Both methods failed. In the first case, no chloracetic acid was formed under conditions which gave 88–95% yields of acetic acid by the oxidation of acetaldehyde. In the second case, even after 12 hours' oxidation, only very small quantities of chloracetic acid were produced.

According to the present invention, a process for the oxidation of monochloracetaldehyde to monochloracetic acid comprises contacting monochloracetaldehyde with gaseous oxygen in the presence of a lower alkanoic acid, a cobalt salt and a promoter such as a halogen-free aldehyde or a ketone. The chloracetaldhyde can be used either in anhydrous form or as its semi-hydrate.

Any lower alkanoic acid (i.e. alkanoic acid containing up to 6 carbon atoms) can be used in the present process, provided that it is liquid under the reaction conditions chosen. Acetic acid is preferred. While it is not necessary that it be anhydrous, preferably the total quantity of water in the reaction mixture is less than 10% of the total weight.

The promoter used in the new process may be of any halogen-free aldehyde or ketone which gives a peroxide on reaction with oxygen, for example acetaldehyde, propionaldehyde or methyl ethyl ketone. The molar ratio of promoter to chloracetaldehyde is preferably 1:1, but is is possible to depart appreciably from this ratio and still obtain satisfactory results. In the process the promoter is oxidized, so that, for example, acetaldehyde is oxidized to acetic acid, which can readily be separated (e.g. by fractional distillation) from the monochloracetic acid obtained in the main reaction.

Various cobalt salts can be used as catalysts. However, the very readily available cobaltous chloride is preferred. The cobalt salt may be used in a relatively small amount, corresponding, for example, to 50 parts per million of cobalt ions in the reaction medium, up to any concentration which is soluble in the reaction medium at the reaction temperature, or even a slightly greater concentration, since during the oxidation process, the cobalt salt is converted into a cobaltic complex having a solubility in the reaction medium which is greater than that of cobaltous salts such as cobaltous chloride.

The gaseous oxygen is conveniently supplied to the reaction mixtures as air. The reaction can be carried out over a wide range of temperatures, for example between 20° and 100° C. Preferably a temperature of about 55° C. is used. The pressure may be between atmospheric pressure and 50 bars. Using pure oxygen, a pressure of 2–3 bars is preferred, but with air a rather higher pressure of 15 bars is preferred.

The process can be carried out batch-wise or continuously. The reactor is charged with the alkanoic acid used as reaction medium, the chloracetaldehyde and the cobalt salt, and then heated to bring the mixture to the desired temperature. The oxygen or air is then introduced and either continuously or at regular intervals, a solution of the promoter in the alkanoic acid is added until the oxidation of the chloracetaldehyde is complete. In continuous operations, the promoter is introduced simultaneously with the chloracetaldehyde, and the oxidized solution is withdrawn continuously. In batch-wise operation, the initial concentration of chloracetaldehyde in the reaction mixture is preferably less than 10%.

The following examples illustrate the invention.

Example I

Glacial acetic acid (1000 g.), chloracetaldehyde semi-hydrate (43.8 g. equivalent to 39.8 g. of anhydrous aldehyde or 0.507 mol), and cobaltous chloride hexahydrate (10.8 g.) are charged into a 3.6 litre autoclave. The pressure in the autoclave is increased to 15 bars with air, and air at this pressure is passed through the autoclave at a rate corresponding to 120 litres per hour at atmospheric pressure. 20 cm.$^3$ of a solution of acetic acid (200 g.) and acetaldehyde (200 g.) are then introduced, the temperature is raised to 55° C., and the remainder of the acetaldehyde solution is then introduced at a rate of 60 cm.$^3$ per hour for 6½ hours. The introduction of air is then stopped, and the reaction mixture distilled. 39.4 g. of monochloracetic acid are obtained, and 2.4 g. of unconverted chloracetaldehyde are recovered. 94% of the chloracetaldehyde is thus used up, and the yield of monochloracetic acid based on the chloracetaldehyde used is 89%.

Example II

Glacial acetic acid (1250 g.), cobaltous chloride hexahydrate (0.3 g.), and acetaldehyde (10 g.) are charged into a vertical tubular reactor, 130 cm. long and 5 cm. in internal diameter, provided with a jacket through which a heating liquid can be circulated. An air pressure of 15 bars is established in the reactor by introduction of air at the bottom, and air is then passed through the reactor at this pressure at a rate corresponding to 300 litres per hour at atmospheric pressure. The temperature is raised to 55° C. and a solution of acetaldehyde in acetic acid is then continually introduced at the bottom of the reactor, and a solution of chloracetaldehyde semi-hydrate in acetic acid introduced at the top. The quantities of reactants are given in the table below. For the first 90 minutes, during which equilibrium conditions are established, no product is withdrawn. At the end of this period the product is withdrawn continuously from the base of the reactor, and the rate of charging of the reactor and of withdrawal of products are adjusted so as to maintain the volume of reaction mixture at about 1.4 litres. From time to time, a small quantity of the cobalt salt is added to the reaction mixture as shown in the table.

TABLE

| Reactants introduced | Between beginning and 1½ hours, g. | Between 1½ hours and 2½ hours, g. | Between 2½ hours and 3½ hours, g. | Between 3½ hours and 4½ hours, g. |
|---|---|---|---|---|
| Acetic acid | 97 | 573 | 573 | 573 |
| Acetaldehyde | 53 | 27 | 27 | 27 |
| Acetic acid | 94 | 72 | 72 | 72 |
| Cobaltous chloride hexahydrate | 0 | 0.15 | 0.15 | 0.15 |
| Chloracetaldehyde semi-hydrate (corresponding to 83% of chloracetaldehyde) | 56 | 28 | 28 | 28 |

The reaction products are separated by distillation. 80% of the starting materials are used up and the yield of chloracetic acid based on chloracetaldehyde converted is the same as in the batch-wise process.

I claim:
1. A process for the preparation of monochloracetic acid which comprises contacting monochloracetaldehyde at 20° to 100° C. with gaseous oxygen at from atmospheric pressure to 50 bars pressure in the presence of a liquid lower alkanoic acid, a cobaltous salt, and, as promoter, a halogen-free aldehyde or a halogen-free ketone.

2. A process according to claim 1 in which the promoter is acetaldehyde.
3. A process according to claim 1 in which the molar ratio of promoter to chloracetaldehyde is about 1:1.
4. A process according to claim 1 in which the lower alkanoic acid is acetic acid.
5. A process according to claim 1 in which the cobalt salt is cobaltous chloride.
6. A process according to claim 1 in which the oxygen is introduced in the form of air.
7. A process for the preparation of monochloracetic acid which comprises contacting monochloracetaldehyde at 20° to 100° C. with air at from atmospheric pressure to 50 bars pressure in the presence of glacial acetic acid, cobaltous chloride and acetaldehyde.

References Cited

UNITED STATES PATENTS 2,294,984    9/1942    Hasche _____ 260—530
3,247,249    4/1966    Saffer et al. _____ 260—530

FOREIGN PATENTS 510,353    2/1955    Canada.

LORRAINE A. WEINBERGER, *Primary Examiner.*

V. GARNER, *Assistant Examiner.*